Patented Dec. 19, 1950

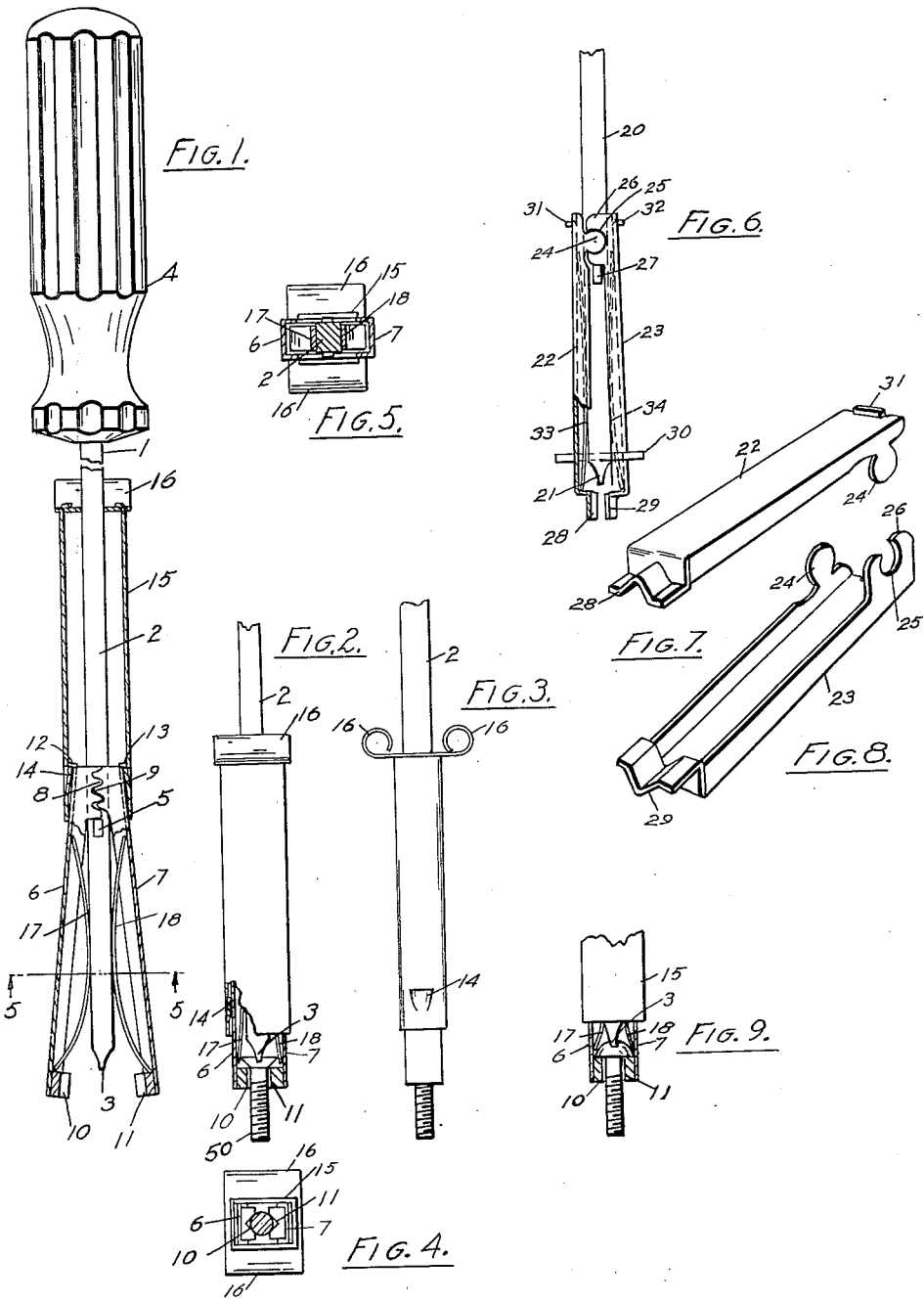

2,534,719

UNITED STATES PATENT OFFICE 2,534,719

SCREW HOLDING SCREW DRIVER

Raymond J. Lohr, Erie, Pa.

Application September 13, 1946, Serial No. 696,867

3 Claims. (Cl. 145—52)

This invention relates generally to an attachment for a screw driver and more particularly to locking means in combination with a screw driver for grasping a screw or a nut.

Attachments have been heretofore provided for screw drivers for holding a screw in alignment with the engaging flattened end of the shank of a screw driver wherein all the driving force on the screw came from the shank of the screw driver. No locking means has been heretofore provided in combination with a screw driver wherein the screw member may be driven into a wood surface or the like without placing any appreciable stress on the end of the shank. Furthermore, screws became cocked in these prior devices because of the narrow fingers for grasping the screw, thereby rendering previous attachments impractical. The shanks of the previous screw drivers upon which the attachments have been mounted have been round, thereby necessarily placing all of the stress upon the pointed end of the shank of the screw driver. Where it has been necessary to drive the screws into hard wood with previous devices, the slot in the head of the screw has been so distorted from driving the pointed end of the screw driver into it that prior devices are of practically no value in such situations. Prior locking devices have not been adaptable to accommodate a plurality of sizes of screws and nuts.

It is, accordingly, an object of my invention to overcome the above and other defects in locking attachments in combination with a screw driver, and it is more particularly an object of my invention to provide a combination screw driver and attachment therefor which is simple in construction, economical in cost, economical in manufacture and efficient in operation.

Another object of my invention is to provide comparatively wide jaws on a locking attachment for a screw driver wherein the screw is held firmly in the jaws for driving purposes.

Another object of my invention is to provide comparatively wide locking jaws on a screw driver attachment wherein a nut may be firmly held when it is desired to threadably engage the nut in an inaccessible location.

Another object of my invention is to provide a novel locking device in combination with a screw driver which moves back a sufficient distance from the point of the shank of the screw driver so as not to provide hindrance in the use of the pointed end of the driver when the locking means are not required.

Another object of my invention is to provide locking jaws on a screw driver and a novel sleeve for locking the jaws firmly on a screw or nut.

Another object of my invention is to provide novel stop means in a screw driver locking attachment to limit the relative movement of the pivoted jaw holding members and the locking sleeves on the shank of the screw driver.

Another object of my invention is to provide a novel attachment for a screw driver wherein a substantial portion of the shank of the screw driver may be utilized for initial rotation of a screw as well as the pointed end of the shank of the screw driver upon locking engagement of the attachment with a screw.

Other objects of my invention will become evident from the following detailed description, taken in conjunction with the accompanying drawings, in which Fig. 1 is a vertical sectional view of my novel locking attachment for a screw driver;

Fig. 2 is a fragmentary side elevational view with the lower part thereof broken away of my novel locking member with a screw grasped by the jaws thereof;

Fig. 3 is a side elevational view of my novel locking member with a screw locked in the end thereof;

Fig. 4 is an end elevational view of my novel locking attachment for a screw driver with a screw disposed in the jaws thereof;

Fig. 5 is a view taken on the line 5—5 of Fig. 1;

Fig. 6 is a side elevational view of a modified form of my novel locking attachment for a screw driver; and Figs. 7 and 8 are perspective views of complementary pivoted jaw members utilized in the modified construction shown in Fig. 6.

Fig. 9 is a fragmentary side elevational view of my locking device with a part thereof broken away showing a round headed screw grasped by the jaws thereof.

Referring now to the drawings, Figs. 1 to 5, inclusive, show a screw driver 1 having a shank 2 rectangular in cross-section, pointed end 3, handle 4, and a projecting stop 5 on the shank 2. My novel locking attachment comprises opposed complementary pivoted members 6 and 7 having projecting intermeshing rack teeth portions 8 and 9 on the inner ends thereof and comparatively wide V-shaped opposed jaws 10 and 11 on the outer ends thereof. The inner ends of the locking jaw members 6 and 7 have upwardly projecting stop flanges 12 and 13 for engaging inwardly struck portions 14 of a rectangular shaped locking sleeve 15, which is adapted to move longitudinally of the shank 2 of the screw driver 1 relative to the pivoted members 6 and 7 to draw the opposed locking jaws 10 and 11 of the members 6 and 7 together to lock a screw 50 between the jaws 10 and 11. The sleeve 15 has an outwardly projecting finger grip portion 16 on one end thereof. Flat, arcuate shaped spring members 17 and 18 engage the shank 2 of the screw driver 1 and also the jaw members 6 and 7 to urge the jaws 10 and 11 to an open position when the sleeve 15 is in a position as shown in Fig. 1. The jaws 10 and 11 are really vise jaws and secure the screw member 50 very rigidly therein. Flat-headed and round-headed machine and wood screws as shown in Figs. 2 and 9 may be accommodated as well as nuts to be threadably engaged to a threaded member in an inaccessible location.

Normally, the sleeve 15 may be drawn flush with the handle 4 of the screw driver 1 so that a substantial portion of the shank 2 of the screw driver 1 extends outwardly past the jaws 10 and 11 on the members 6 and 7 so that there is no hindrance from my novel locking attachment to the normal use of the pointed end 3 of the shank 2 of the screw driver 1 for rotating a screw.

When it is desired to lock a screw or a nut in the jaws 10 and 11, pivoting members 6 and 7 and sleeve 15 are moved forward on the shank 2 until the portions 8 and 9 of the members 6 and 7 abut the stop 5 as shown in Fig. 1. The stop 5 is so positioned that the jaws 10 and 11 of the members 6 and 7 extend outwardly a sufficient distance ahead of the pointed end 3 of the shank 2 of the screw driver 1 so that a wide range of sizes of flat and round headed screws and nuts may be accommodated. The screw 50 is then disposed between the jaws 10 and 11 of the jaw members 6 and 7 and the sleeve 15 is forced over the pivoting members 6 and 7 to secure the screw 50 rigidly between the opposing jaws 10 and 11. Because of the long tapered surface presented by the members 6 and 7, greater leverage is provided to exert high pressure on the screw 50 by jaws 10 and 11 and the screw member 50 is firmly locked between the jaws 10 and 11 by the sleeve 15. Stop flanges 12 and 13 on the jaw members 6 and 7 engage inwardly struck portions 14 on the sleeve 15 to limit the longitudinal movement of the sleeve 15 when the sleeve 15 is pulled longitudinally relative to the jaw members 6 and 7 to release the screw 50 from the jaws 10 and 11. Although I have shown the pointed end 3 of the shank 2 as more or less of a flat point, it will be evident that the point may be cruciform to accommodate cruciform type screws.

It will be evident that the slotted screw-head may be forcibly held in operative position in engagement with the pointed end 3 of the shank 2 of the screw driver, thereby minimizing any chance of disengagement and consequent damage to the screw and the screw driver.

In the modified form of my invention shown in Figs. 6, 7, and 8, I provide a locking attachment for a screw driver with the same principles as those set forth above except that the manufacturing processes are simplified in production of the locking attachment for a screw driver. In Figs. 6, 7, and 8, I show a rectangular shaped shank 20 of a screw driver with a pointed end 21 upon which is mounted similar opposed flanged complementary pivoted members 22 and 23, each member having an inwardly projecting circular portion 24 on one side thereof and an open cylindrical groove 25 in a projecting portion 26 on the opposite side thereof. The circular portions 24 engage the opposing grooves 25 in projecting portion 26 in the members 22 and 23 to form a pivotable connection therebetween. Stop member 27 on the shank 20 is provided to limit the longitudinal movement of the pivoted members 22 and 23 upon the shank 20. The outer ends of the pivoted members 22 and 23 are offset inwardly to form V-shaped opposed jaw members 28 and 29. A locking member 30 moves longitudinally of the pivoting members 22 and 23 to lock a screw between the jaw members 28 and 29 of the pivoting members 22 and 23. It will be evident that the locking member 30 is reduced to its simplest form. Upwardly projecting stop flanges 31 and 32 are provided on members 22 and 23 to limit the longitudinal movement of the locking member 30. Spring members 33 and 34 normally urge the pivoting members 22 and 23 outwardly when the locking member 30 is disposed adjacent the stop flanges 31 and 32 on the locking members 22 and 23. Fabrication of my modified form of locking device is greatly simplified in that similar locking jaws 22 and 23 may be stamped in the same die.

The operation of my novel locking attachment shown in Fig. 6 is substantially the same as that shown in Figs. 1 to 5, inclusive, as has been heretofore described.

In my novel locking attachment for a screw driver, a screw is locked rigidly betwen the jaws of the locking device and the shank of the screw driver may be utilized as well as the pointed end thereof for initial rotation of the screw. My novel locking attachment for a screw driver is truly a locking device, as compared to previous holding devices.

Various changes may be made in the specific embodiment of my invention without departing from the spirit thereof, or from the scope of the appended claims.

What I claim is:

1. A combination screw driver and locking attachment comprising a shank having opposite sides thereof flattened, a stop on said shank, similar complementary pivoted members slidable on said shank, each member having an outwardly extending circular portion and an outwardly circular grooved portion for pivotable interengagement on one end thereof and offset jaw portion on the opposite end thereof, flat, arcuate shaped springs engaging the opposite flattened surfaces of said shank and the inner side of said pivoted members and held against longitudinal movement therein by the offset jaw portion of said pivoted members, and a locking member movable over the outer surface of said pivoted members to close the jaw portions thereof.

2. A combination screw driver and locking attachment as set forth in claim 1 wherein upwardly flanged portions are provided on said pivoted members to limit the longitudinal movement of said locking member.

3. A combination screw driver and locking attachment comprising a shank having opposite sides thereof flattened, a stop on said shank, similar complementary pivoted members slidable on said shank, outwardly extending engaging portions on said members for pivotable interengagement on one end thereof and off-set jaw portions on the opposite ends thereof, flat, arcuate shaped springs engaging the opposite flattened surfaces of said shank and the inner side of said pivoted members and held against longitudinal movement therein by the offset jaw portion of said pivoted members, and a locking member movable over the outer surfaces of said pivoted members to close and lock the jaw portions thereof.

RAYMOND J. LOHR.

REFERENCES CITED

The following references are of record in the file of this patent:

UNITED STATES PATENTS

| Number | Name | Date |
| --- | --- | --- |
| 415,481 | Teubner | Nov. 19, 1889 |
| 625,046 | Mann | May 16, 1899 |
| 730,804 | Starrett | June 9, 1903 |
| 899,203 | Carlson | Sept. 22, 1908 |
| 1,755,588 | Bronk | Apr. 22, 1930 |
| 1,764,504 | Bronk | June 17, 1930 |
| 2,056,256 | Conklin | Oct. 6, 1936 |
| 2,206,364 | Petre | July 2, 1940 |